United States Patent
Chen et al.

(10) Patent No.: US 7,733,671 B2
(45) Date of Patent: Jun. 8, 2010

(54) SWITCHING REGULATORS

(75) Inventors: Hung-I Chen, Kaohsiung (TW); Shiue Shin Liu, HsinChu (TW)

(73) Assignee: Mediatek Inc., Hsin-Chu (TW)

( * ) Notice: Subject to any disclaimer, the term of this patent is extended or adjusted under 35 U.S.C. 154(b) by 245 days.

(21) Appl. No.: 11/763,557

(22) Filed: Jun. 15, 2007

(65) Prior Publication Data

US 2007/0296389 A1    Dec. 27, 2007

Related U.S. Application Data

(60) Provisional application No. 60/805,612, filed on Jun. 23, 2006.

(51) Int. Cl.
*H02M 3/335* (2006.01)
(52) U.S. Cl. .................................. 363/21.04; 323/222
(58) Field of Classification Search .................. 323/222, 323/282–288, 351; 363/21.01, 21.04, 21.12, 363/97, 98
See application file for complete search history.

(56) References Cited

U.S. PATENT DOCUMENTS

| | | | |
|---|---|---|---|
| 4,837,495 A | 6/1989 | Zansky | |
| 5,111,133 A | 5/1992 | Poulo et al. | |
| 5,479,090 A * | 12/1995 | Schultz | 323/284 |
| 5,903,452 A | 5/1999 | Yang | |
| 6,611,131 B2 | 8/2003 | Edwards | |
| 7,515,441 B2 * | 4/2009 | Kashima | 363/21.01 |

FOREIGN PATENT DOCUMENTS

JP    2005269807    9/2005

OTHER PUBLICATIONS

English Abstract of JP2005269807.

* cited by examiner

*Primary Examiner*—Rajnikant B Patel
(74) *Attorney, Agent, or Firm*—Thomas, Kayden, Horstemeyer & Risley

(57) ABSTRACT

A switching regulator. A pulse width modulation (PWM) unit comprises an output stage and generates a PWM driving signal to control the output stage, such that an inductor delivers an inductor current signal to the load, and a slope compensation unit outputs a slope compensation signal with a compensation slope proportional to a falling slope of the inductor current signal to the PWM unit according to the inductor current signal.

20 Claims, 14 Drawing Sheets

| D | $\frac{D}{1-D}$ |
|---|---|
| 0.5 | 1 |
| 0.6 | 1.5 |
| 0.7 | 2.3 |
| 0.8 | 4 |
| 0.9 | 9 |

Table 1

FIG. 9

SWITCHING REGULATORS

CROSS REFERENCE TO RELATED APPLICATIONS

This application claims the benefit of U.S. Provisional Application No. 60/805,612, filed Jun. 23, 2006, incorporated herein by reference.

BACKGROUND OF THE INVENTION

1. Field of the Invention

The invention relates to DC voltage conversion, in particularly to switching regulators with slope compensation and slope compensation method thereof.

2. Description of the Related Art

Battery life is a major consideration for portable electronic systems. This is particularly true for consumer electronics, such as cellular phones, digital cameras, portable computers and other handheld equipment. Designers of these products are faced with a continual need to reduce package size (and battery size) while increasing battery life to match or exceed competitive products.

To maximize battery life, it is necessary to optimize the performance of a wide range of different electronic components. Among the most important of these components are voltage regulators. In portable electronic systems, these devices perform a range of power handling tasks including increasing, decreasing and inverting voltage.

FIG. 1 shows a voltage-mode control switching regulator that converts high DC voltage to lower. The advantages of voltage-mode control are ease of analysis and a large ramp wave providing good noise immunity. However, in terms of transient-response, because any change in line or load must first be detected by the feedback resistor divider and then responded to via error amplifier and PWM generator, response speed is reduced. Further, because the output L-C network provides a complex-pole pair and the loop gain varies with the input voltage, loop compensation design is much more complicated.

BRIEF SUMMARY OF THE INVENTION

A detailed description is given in the following embodiments with reference to the accompanying drawings.

A switching regulator is provided, in which an inductor is coupled to a load, and a pulse width modulation (PWM) unit comprises an output stage and generates a PWM driving signal to control the output stage, such that the inductor delivers an inductor current signal to the load, and a slope compensation unit outputs a slope compensation signal with a compensation slope proportional to a falling slope of the inductor current signal to the PWM unit according to the inductor current signal.

The invention provides another embodiment of a switching regulator, in which an inductor is coupled to a load, and a slope compensation unit is coupled to the inductor and obtains a falling slope of an inductor current signal through the inductor according to a rising slope of the inductor current signal and a duty cycle of a pulse width modulation (PWM) driving signal and outputs a slope compensation signal with a compensation slope proportional to the falling slope of the output current. A current detection unit detects the inductor current signal and outputs a current detection signal proportional to the inductor current signal to the PWM unit and the slope compensation unit. A pulse width modulation unit comprises a comparator coupled to the current detection signal, the slope compensation signal and a feedback signal and at least one output transistor outputs the PWM driving signal to the inductor. A feedback unit is coupled between the comparator and the inductor and generates the feedback signal according to an output voltage of the switching regulator.

The invention also provides an embodiment of a slope compensation method for a switching regulator, in which a rising slope of an inductor current signal output to a load from a PWM unit is detected, and a duty cycle of a PWM driving signal generated by the PWM unit is detected. A slope compensation signal with a compensation slope proportional to a falling slope of the inductor current signal is generated according to the rising slope of the inductor current signal and the duty cycle of the PWM driving signal, and the PWM unit is controlled according to the slope compensation signal.

BRIEF DESCRIPTION OF THE DRAWINGS

The invention can be more fully understood by reading the subsequent detailed description and examples with references made to the accompanying drawings, wherein:

FIG. 9 is a table listing values of $$\frac{D}{1-D}$$

Figure 10:
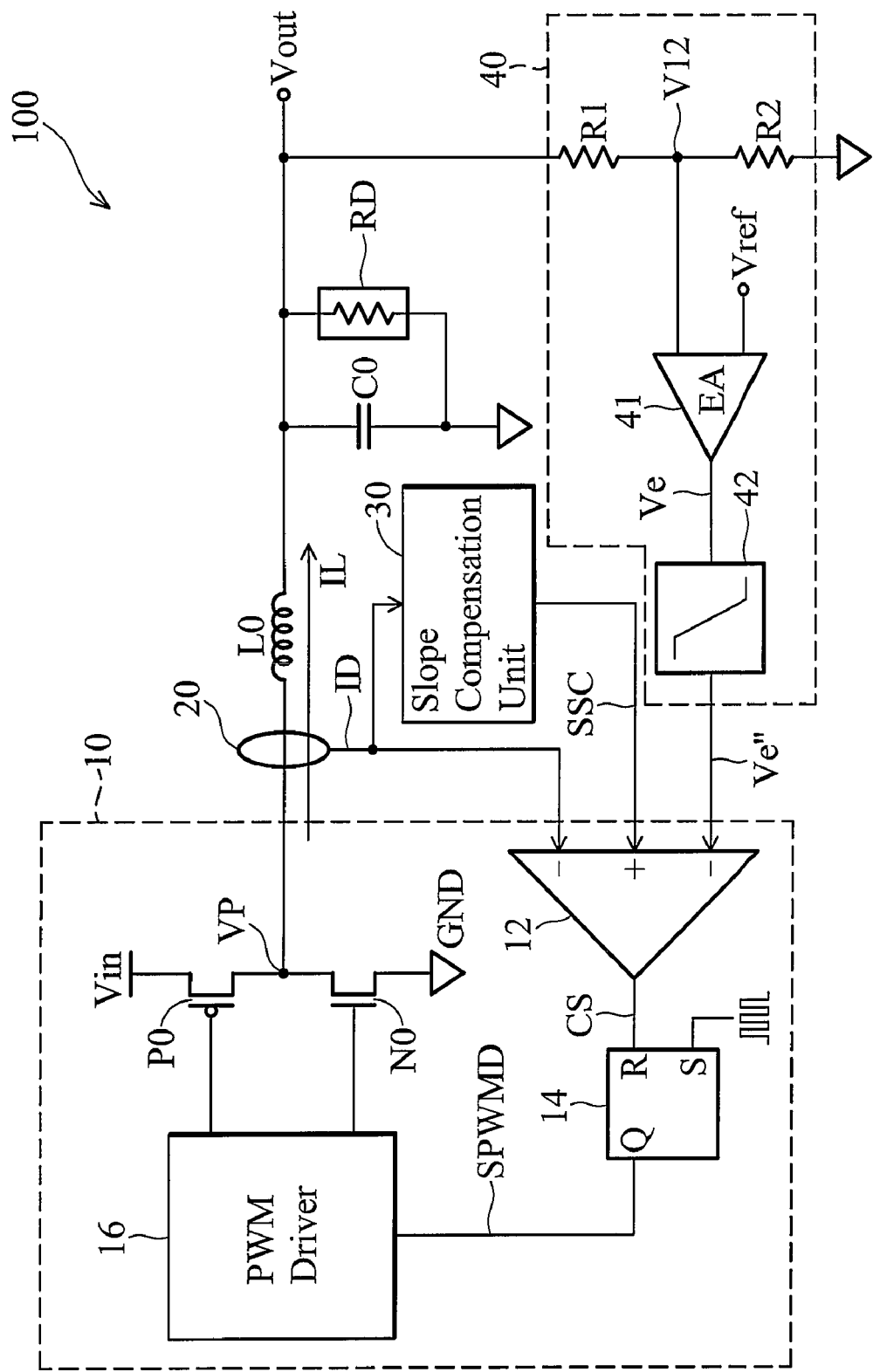
Figure 11:
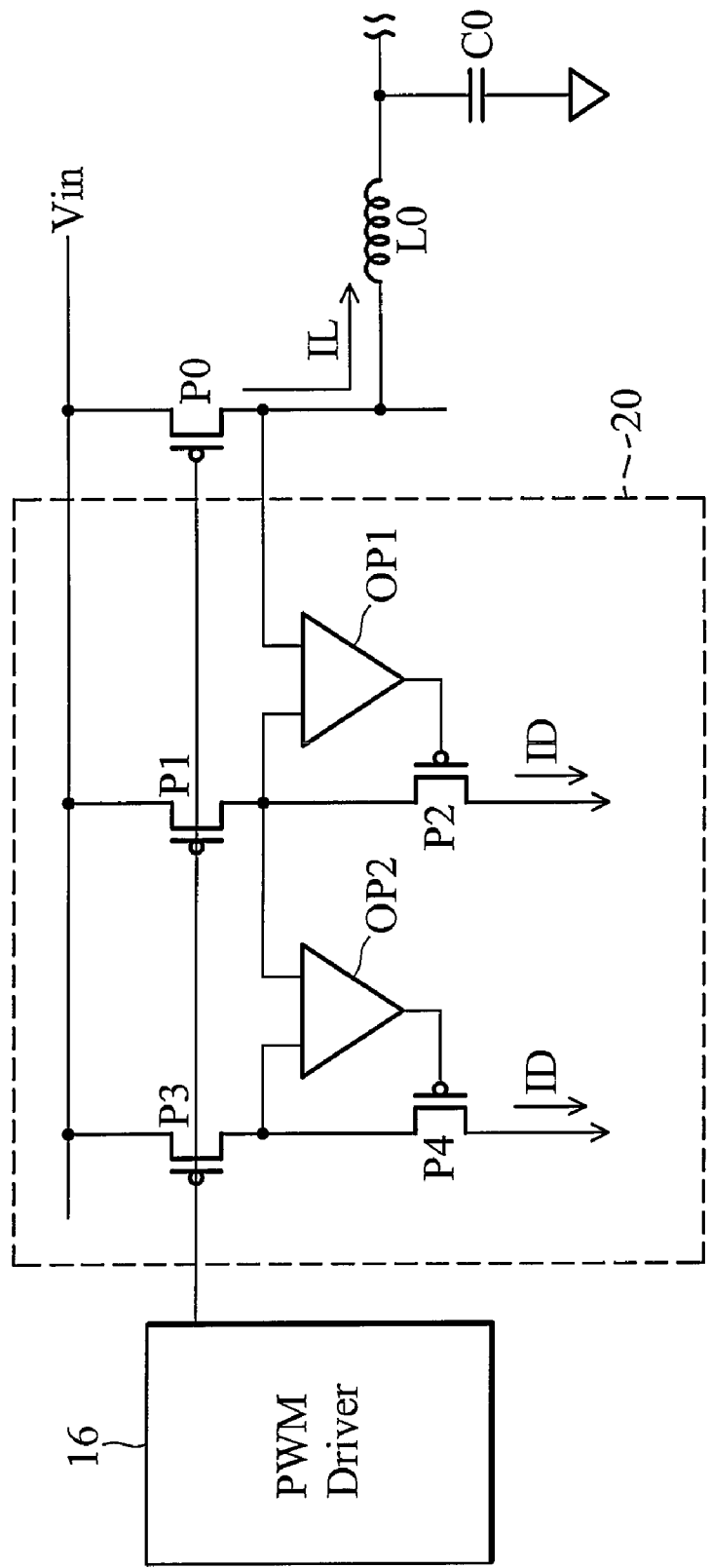

with different D value;

FIG. 10 shows another embodiment of a current-mode control switching regulator;

FIG. 11 shows embodiments of a current detection unit and a slope compensation unit.

Figure 12:
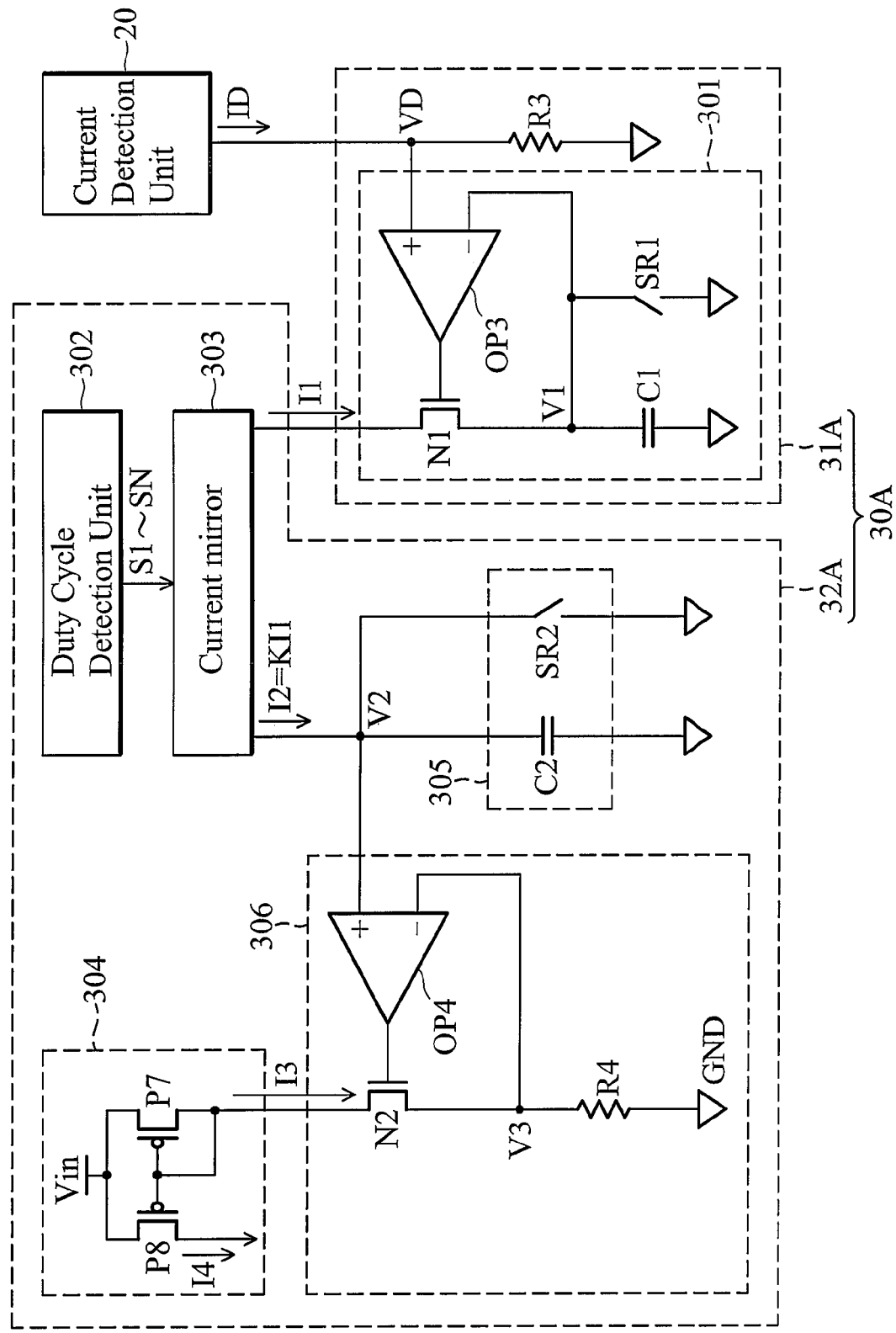
Figure 13:
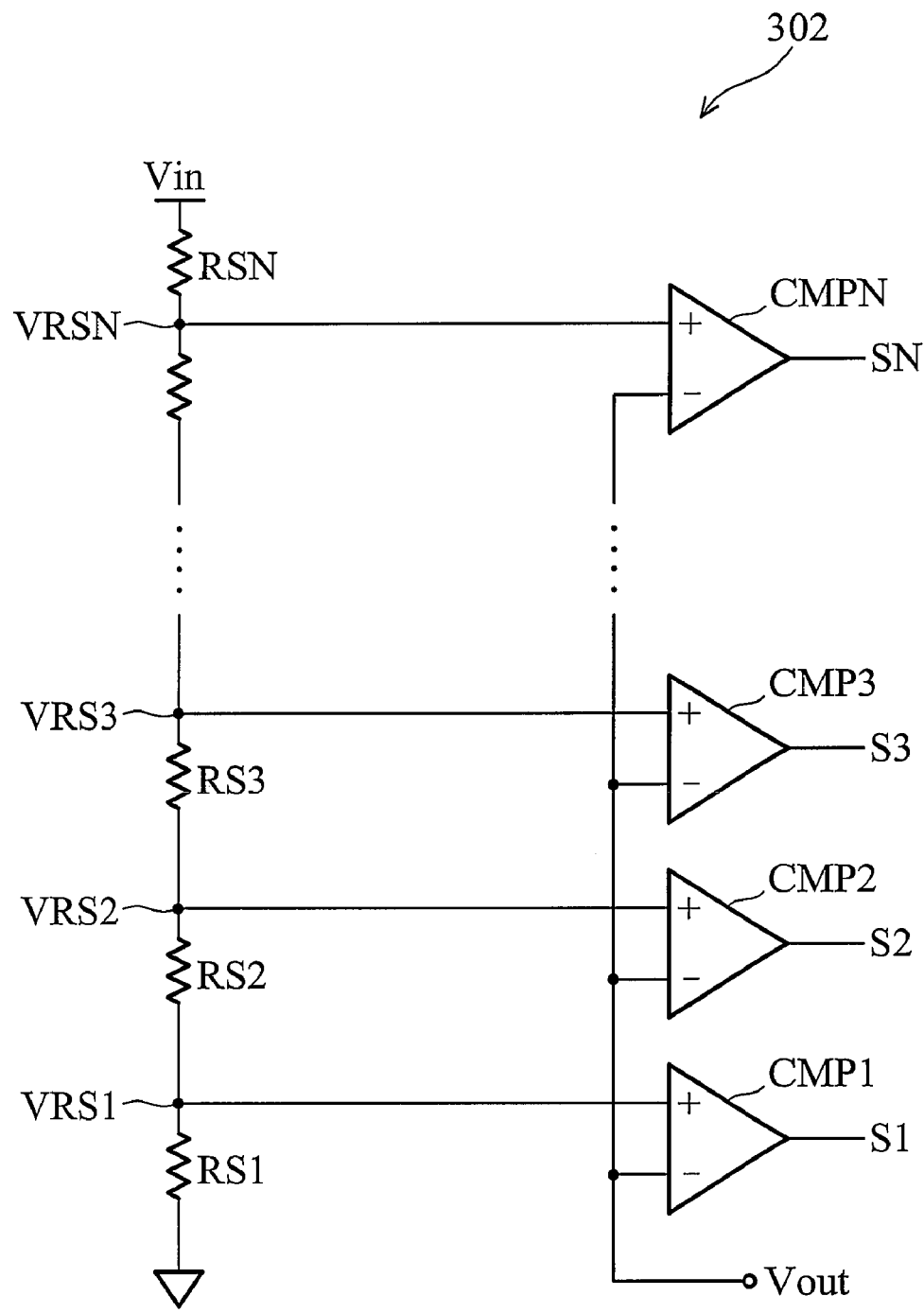
Figure 14:
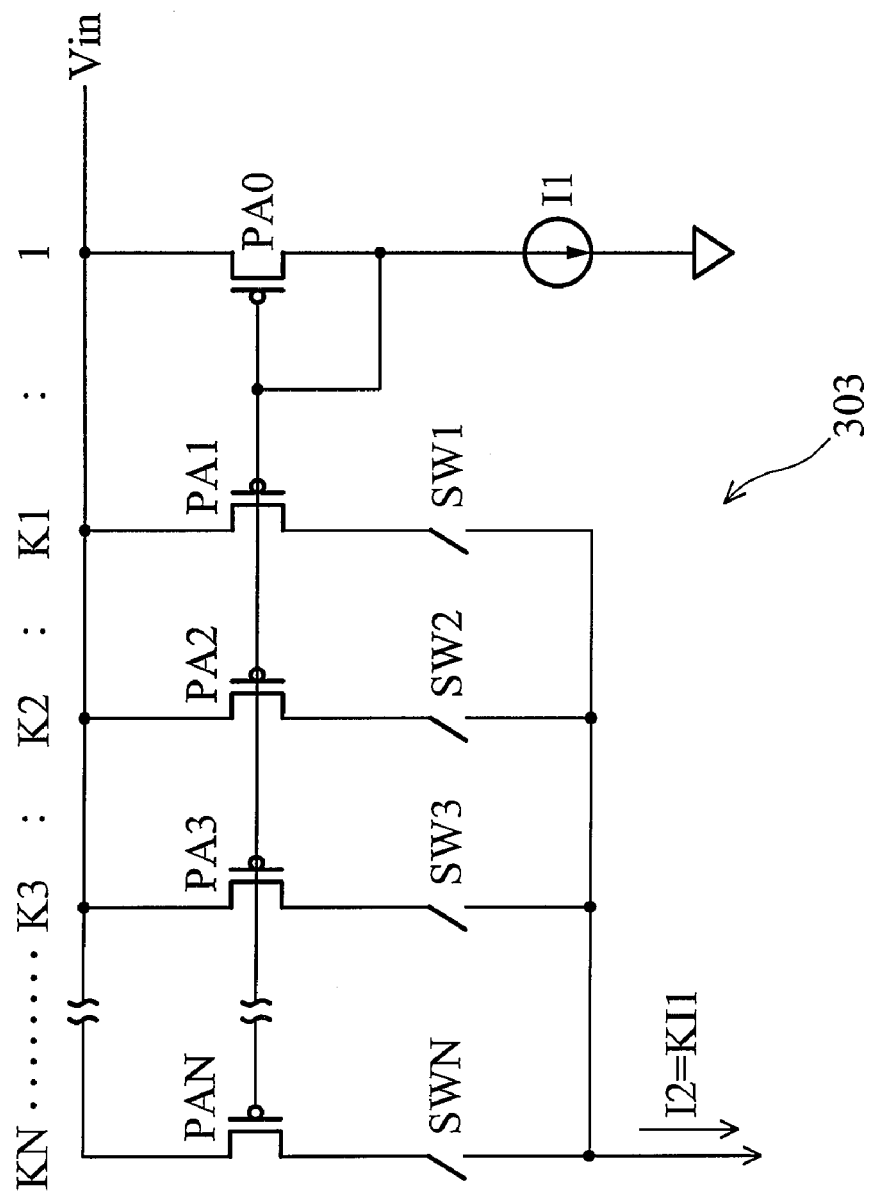
Figure 15:
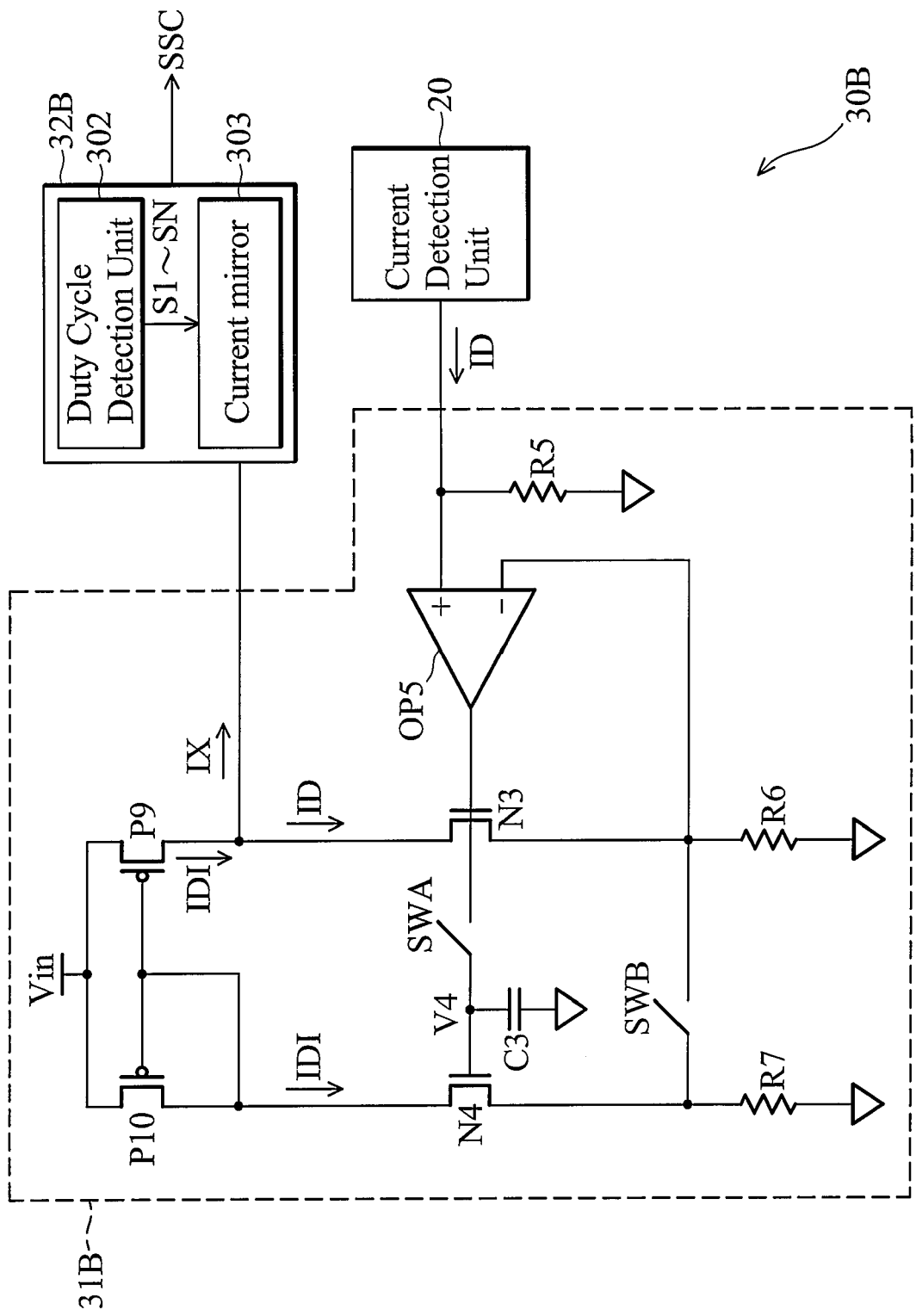
Figure 16:
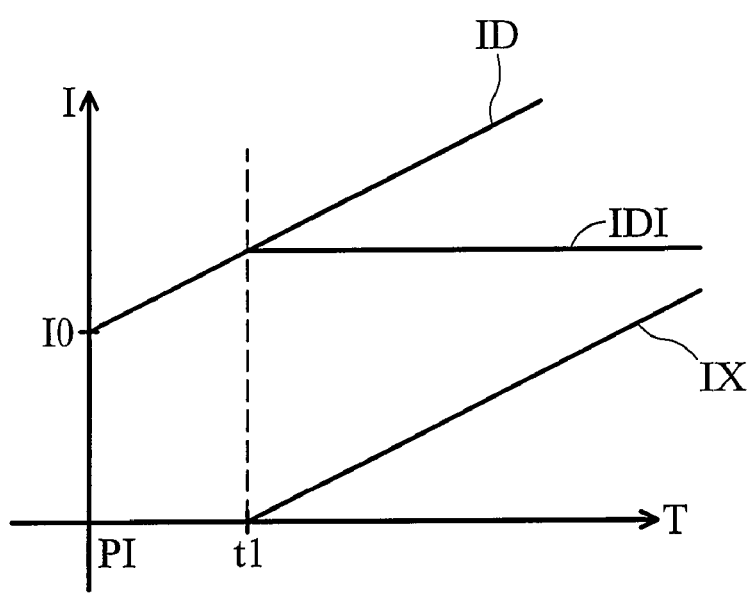
Figure 17:
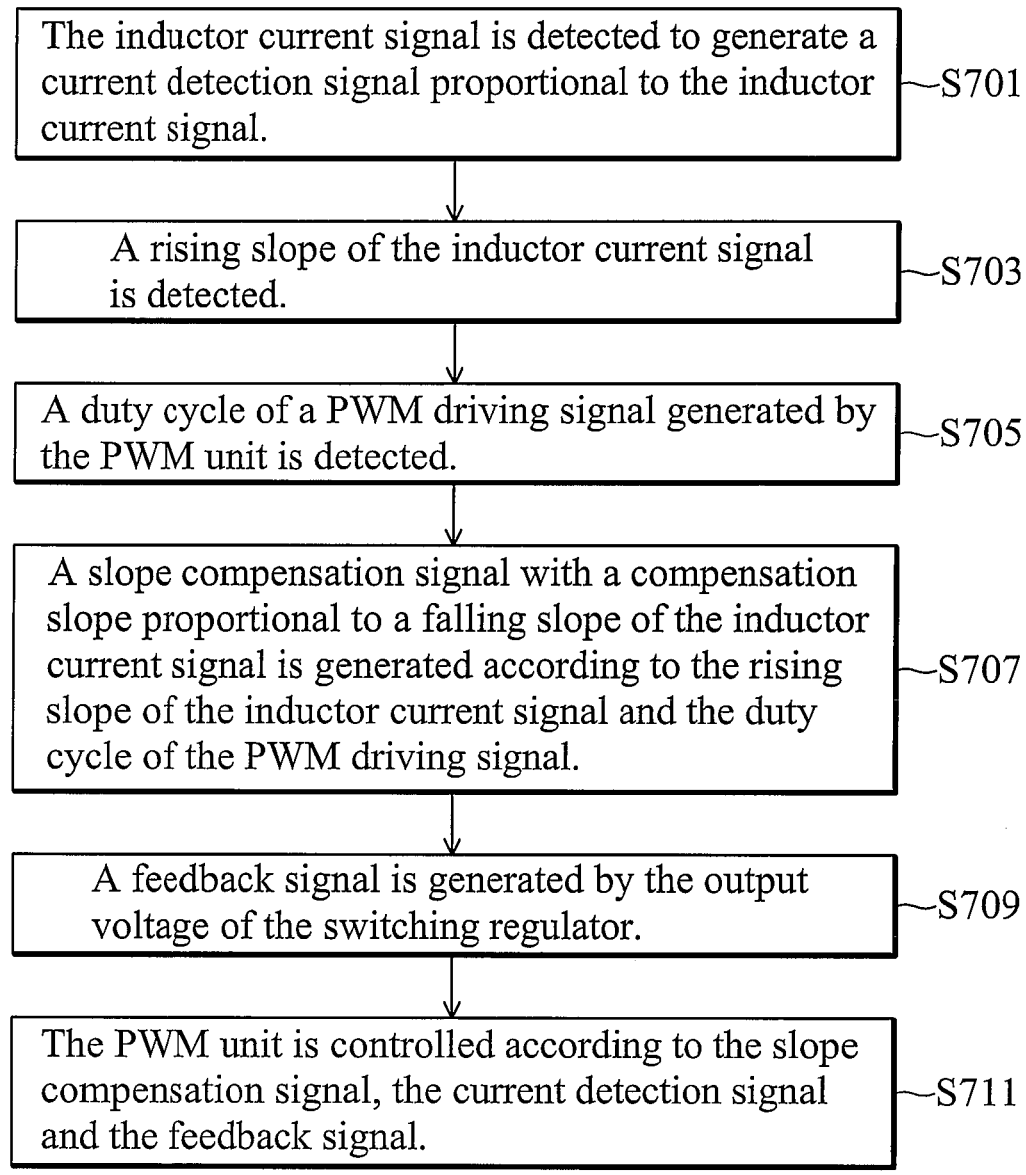

FIG. 12 shows an embodiment of a slope compensation unit;

FIG. 13 shows an embodiment of a duty cycle detection unit;

FIG. 14 shows an embodiment of a current mirror;

FIG. 15 shows another embodiment of a slope compensation unit;

FIG. 16 shows the relationship between the current detection signal ID, the initial current signal IDI and the current signal IX shown in FIG. 15; and FIG. 17 is a flowchart of the slope compensation method of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
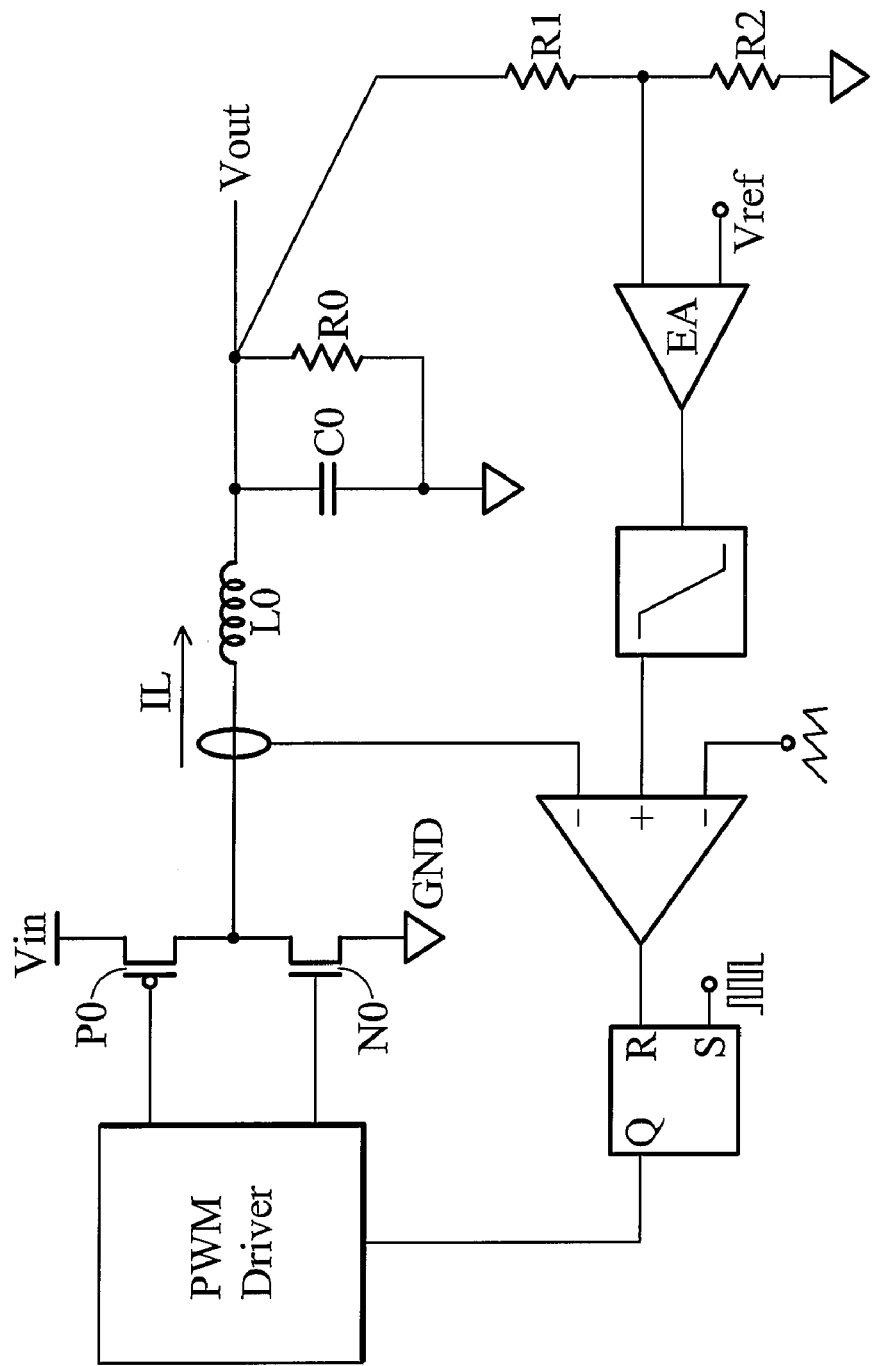
FIG. 2 shows an embodiment of a current-mode control switching regulator.

FIG. 2 shows an embodiment of a current-mode control switching regulator. As shown, in addition to the feedback voltage, the instantaneous inductor current signal IL is also fed back to the control loop, in which the inductor current signal IL in a steady state is a triangular wave signal. After comparing the inductor current signal IL with the output signal of the error amplifier (EA), a PWM control signal is generated to control the ON/OFF of the PWM output stage. Moreover, a slope compensation signal is added to the inductor current signal IL or subtracted from the output signal of error amplifier for stability.

Since the inductor current signal that relates to Vin-Vout information is fed back, the loop responds faster to the input voltage (Vin) transient. Second, since the output signal of the error amplifier is an indication of inductor current signal, the inductor branch can be regarded as a voltage controlled current source in the current-mode control, and thus, the inductor pole is eliminated. Compensation of the loop is thus easier than with the voltage-mode control switching regulator. Finally, because the input signals of the comparator stage are current signal pulse-by-pulse current limitation is inherently provided in the current-mode control switching regulator.

Figure 3:
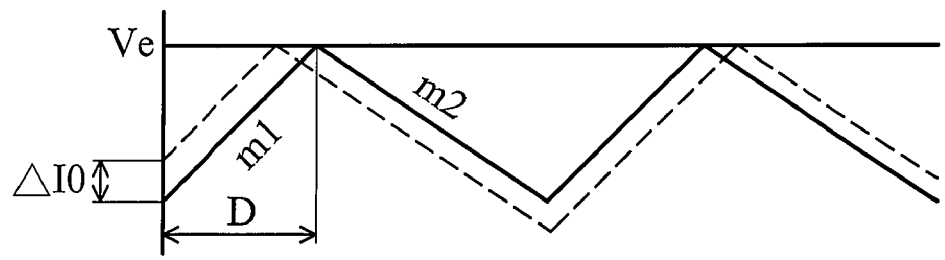
FIG. 3 shows a control loop waveform of a current-mode control switching regulator in a steady state.

FIG. 3 shows a control loop waveform of a current-mode control switching regulator in a steady state. As shown, the straight line on Ve level is the output signal of the error amplifier (EA), and the solid triangular wave is the fed back inductor current signal IL. When the PWM output stage is ON, the voltage across the inductor L0 is positive, and the inductor current signal IL increases. When the inductor current signal IL equals the output signal of the error amplifier (EA), the comparator changes the polarity of its output and the PWM output stage is OFF. The voltage across the inductor the inductor L0 becomes negative and the inductor current signal IL decreases until the next ON signal at the PWM output stage.

Figure 4:
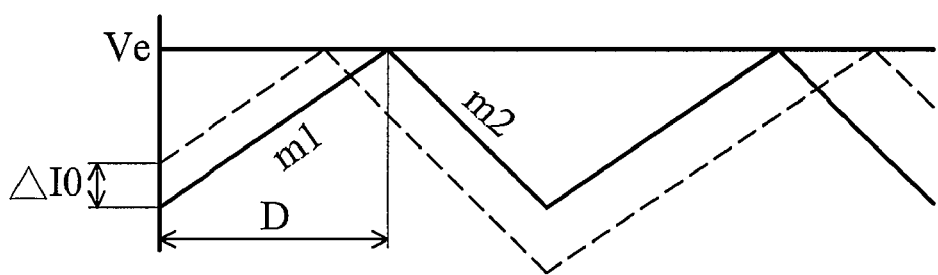
FIG. 4 shows a control loop waveform of a current-mode control switching regulator with duty cycle exceeding 0.5 in a steady state.

If there is a small perturbation on the inductor current signal IL such as the delta 10 shown in FIG. 3, the dashed triangular wave will be the proceeding waveform of the inductor current signal IL. For PWM duty cycle (D) <0.5 as shown in FIG. 3, the perturbation fades out and the steady state is recovered. However, if the steady state duty cycle (D) >0.5 as shown in FIG. 4, the perturbation introduced in the first cycle will be amplified cycle-by-cycle and the loop will be diverge. To amend this issue, a slope-compensation wave is added to the inductor current signal IL.

Figure 5:
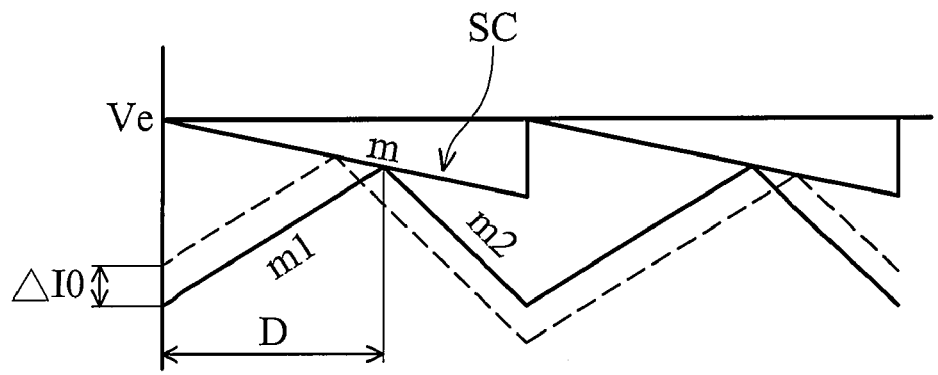
FIG. 5 shows a control wave waveform with a slope compensation subtracted from the output of the error amplifier.
Figure 6:
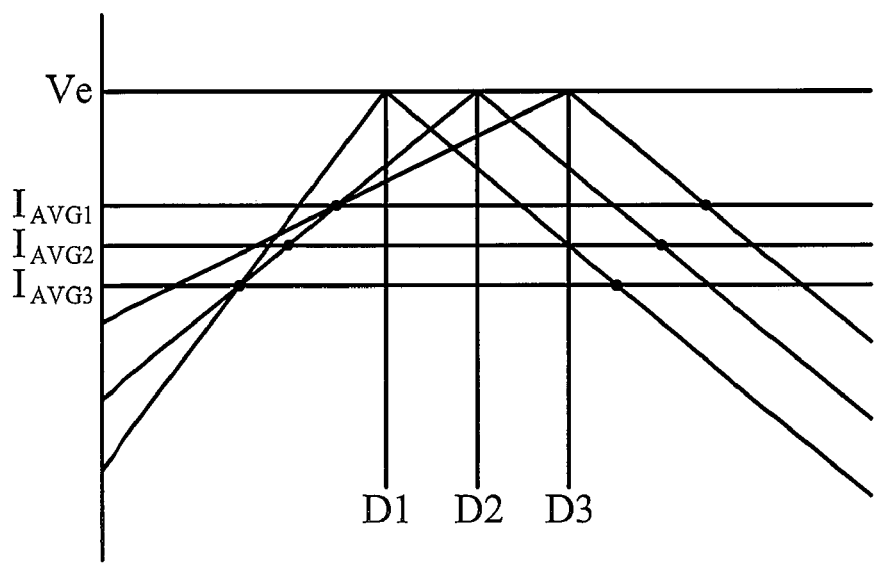
FIG. 6 shows the relationship between an output signal of an error amplifier and average inductor current signals.

FIG. 5 shows the waveform with a slope compensation SC subtracted from the output of the error amplifier. As shown, m1 and m2 are the rising slope and the falling slope of the inductor current signal IL respectively. It is observed that even in the steady state of duty cycle >0.5, the perturbation still dies out after few cycles. It is now to be determined the degree of the slope compensation to be added to the system. First, according to the relationship between the output signal of the error amplifier and the average inductor current signals $I_{AVG1} \sim I_{AVG3}$ shown in FIG. 6, the output of the error amplifier merely defines the peak current of the inductor rather than the average. With the same output of the error amplifier, the averaged inductor current signal is also defined by the duty cycle, i.e., the relationship between input and output voltages of the steady state. Thus, once line transience occurs, the output voltage of the error amplifier responds it to reach the new steady state.

Figure 7:
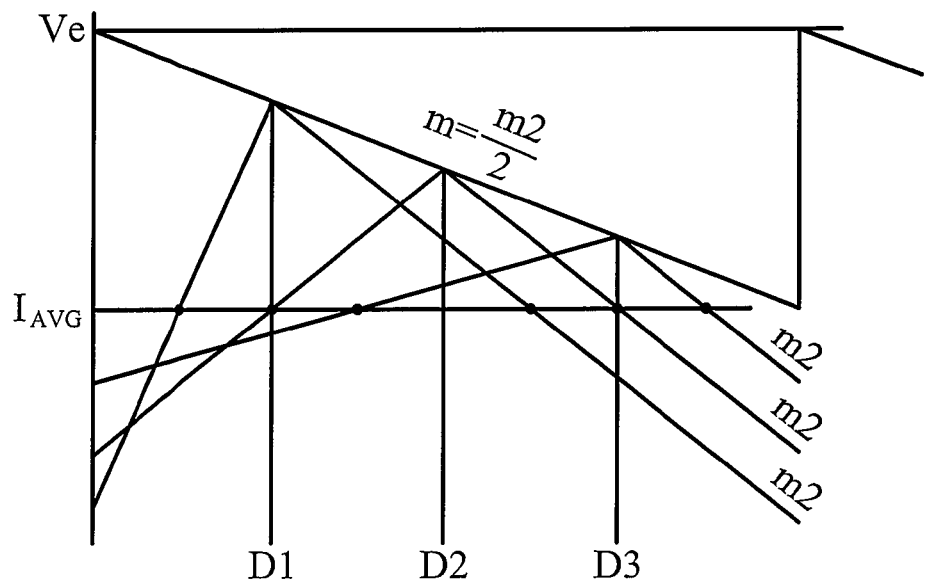
FIG. 7 shows a slope compensation waveform wherein a compensation slope m equals half of the falling slope of an inductor current signal.
Figure 8:
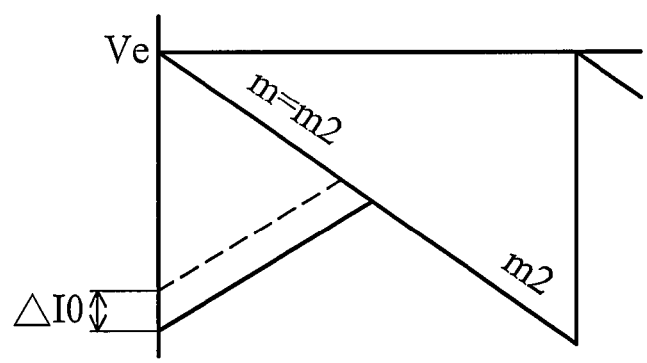
FIG. 8 shows a slope compensation waveform wherein a compensation slope m is identical to the falling slope of an inductor current signal.

FIG. 7 shows a slope compensation waveform wherein compensation slope m equals half of m2, wherein m2 is the falling slope of the inductor current signal IL. Accordingly, the perturbation dies out for the entire duty cycle range (0~1) and the output voltage of the error amplifier indicates the average inductor current irrelevant to the duty cycle. The control loop thus exhibits favorable line transient response because the output of the error amplifier needs not change. FIG. 8 shows a slope compensation waveform wherein compensation slope m equals m2. As shown, if perturbation occurs at the rising edge of the inductor current signal, it will be rejected in only one cycle and good noise immunity is obtained.

However, the slope compensation techniques described use information of the falling slope m2 of the inductor current signal IL, difficult to detect in real circuit implementation, especially in a highly integrated switching regulator IC. Nevertheless, there exists a relationship between the rising slope m1 and the falling slope m2 of the inductor current signal IL. Thus, some embodiments can detect the rising slope of the inductor current signal, and indirectly derive the falling slope and generate a slope compensation signal accordingly.

Figure 1:
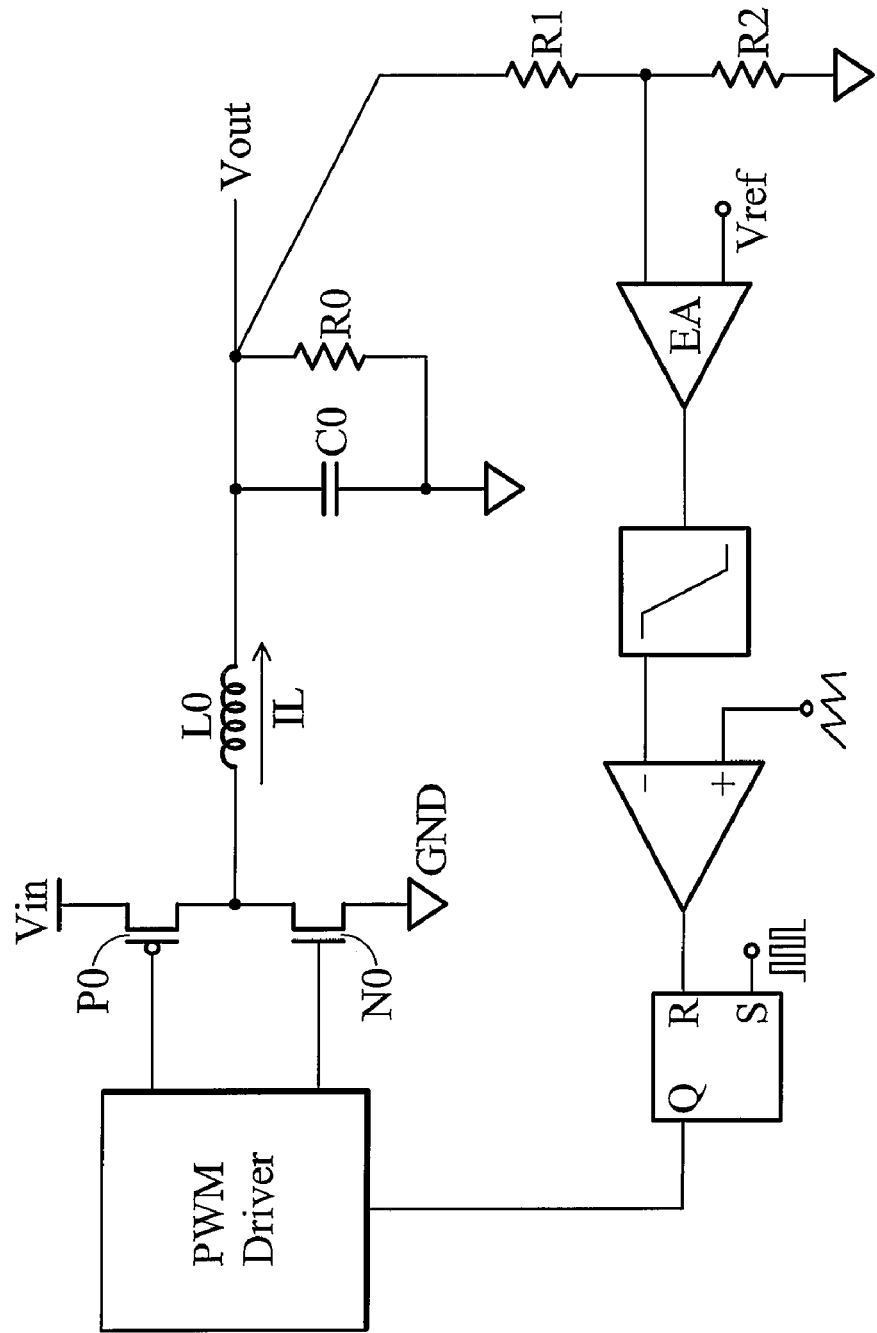
FIG. 1 shows a conventional voltage-mode control switching regulator.

It is assumed that a buck converter shown in FIG. 1 or FIG. 2 can have a steady state PWM duty cycle (D), and then the relationship between input voltage Vin and the output voltage Vout can be presented as $$\frac{Vout}{Vin} = D.$$

Further, it is assumed that the rising slope and falling slope of the inductor current signal IL are m1 and m2 respectively, and the ratio thereof can be presented as $$\frac{m2}{m1} = \frac{D}{1-D}.$$

Namely, the information of m2 actually needed in the slope compensation technique can be extracted if the duty cycle D and the rising slope m1 of the inductor current IL are obtained. As shown in FIG. 9, Table 1 lists some value of $$\frac{D}{1-D}$$

with different D value.

FIG. 10 shows another embodiment of a current-mode control switching regulator. The switching regulator 100 derives the falling slope m2 of the inductor current signal from the rising slope m1 thereof and the duty cycle D and uses it for slope compensation. As shown, the switching regulator 100 comprises a pulse width modulation (PWM) unit 10, a current detection unit 20, a slope compensation unit 30, a feedback unit 40, an inductor L0 and a capacitor C0.

The PWM unit 10 is coupled between the inductor L0 and the feedback unit 40 and comprises a PWM comparator 12, a SR latch 14, a PWM driver 16 and an output stage comprising a PMOS transistor P0 and a NMOS transistor N0. The PWM unit 10 generates a PWM driving signal SPWMD to control the output stage, such that inductor L0 delivers an inductor current signal IL to a capacitor C0 and a load RD. The PWM comparator 12 generates a control signal CS according to a current detection signal ID, a slope compensation signal SSC and a feedback signal Ve" from the feedback unit 40. The SR latch 14 comprises a set terminal (S) receiving a clock signal, a rest terminal (R) receiving the control signal from the PWM comparator 12, and an output terminal (Q) outputting a pulse width modulation driving signal SPWMD to the PWM driver 16. The SR latch 14 generates the PWM driving signal SPWMD to the PWM driver 16 to turn the output stage on and off according to the control signal CS and the clock signal. For example, the feedback signal Ve" can be a voltage signal, and the current detection signal ID and the slope compensation signal SSC current signals. Further, the current detection signal ID and the slope compensation signal SSC can be combined and converted to a voltage signal by a resistor (not shown) for comparison with the feedback signal Ve". Alternatively, a voltage-to-current converter between the error amplifier 41 and the phase compensation unit 42 converts the output signal Ve to a current signal for comparison with the combination of the current detection signal ID and the slope compensation signal SSC.

In some embodiments, the duty cycle of the pulse width modulation driving signal SPWMD is determined by the control signal CS. For example, when the clock signal received at the set terminal (S) of the SR latch 14 goes high, the PWM driving signal SPWMD of the SR latch 14 also goes high, such that the PMOS transistor P0 and the NMOS transistor N0 are turned on and off respectively and the inductor current signal IL increases accordingly. If the voltage signal generating the combination of the current detection signal ID and the slope compensation signal SSC exceeds the feedback signal Ve", the comparator 12 generates a low logic output to reset the SR latch 14. Hence, the PWM driving signal SPWMD of the SR latch 14 goes low, such that the PMOS transistor P0 and the NMOS transistor N0 are turned off and on respectively, and the inductor current signal IL decreases until the PWM driving signal SPWMD of the SR latch 14 goes high again.

The current detection unit 20 detects the inductor current signal IL and outputs a current detection signal ID proportional to the inductor current signal IL to the PWM unit 10 and the slope compensation unit 30. For example, the current detection unit 20 can be a current duplication circuit.

The slope compensation unit 30 outputs a slope compensation signal SSC with a compensation slope proportional to a falling slope of the inductor current signal IL to the PWM unit 10 according to the inductor current signal IL. For example, the slope compensation unit 30 can generate the slope compensation signal SSC with a compensation slope half the falling slope of the inductor current signal IL, equal to the falling slope of the inductor current signal IL or the like, but is not limited thereto.

The feedback unit 40 generates the feedback signal Ve" according to an output voltage Vout of the switching regulator 100, such that the PWM unit 10 generates the PWM driving signal SPWMD according to the slope compensation signal SSC, the current detection signal ID and the feedback signal Ve". The feedback unit 40 comprises resistors R1 and R2, an error amplifier 41 and an additional phase compensation unit 42. The resistors R1 and R2 generate a divided voltage V12 according to the output voltage Vout of the switching regulator 100 and output to the error amplifier 41. The error amplifier 41 generates the output signal Ve according to the difference between the divided voltage V12 and a reference voltage Vref. The additional phase compensation unit 42 is coupled between the error amplifier 41 and the PWM comparator 12 to perform phase compensation on the output signal Ve and generate a feedback signal Ve" to the PWM comparator 12.

Because the slope compensation unit 30 can generate a slope compensation signal SSC with a compensation slope proportional to the falling slope of the inductor current signal IL to perform a slope compensation according to the duty cycle D of the PWM driving signal SPWMD and the rising slope of the inductor current signal IL, perturbation will be rejected in a few cycles and noise immunity obtained as shown in FIGS. 7 and 8.

FIG. 11 shows embodiments of the current detection unit and the slope compensation unit. As shown, the current detection unit 20 detects the inductor current signal IL and outputs a current detection signal ID proportional to the inductor current signal IL. The current detection unit 20 comprises four PMOS transistors P1~P4 and two operational amplifiers OP1 and OP2, in which the gate terminals of the PMOS transistors P0~P4 are coupled to the PWM driver 16 in common. For example, the PMOS transistors P1~P2 and the operational amplifier OP1 can form a current duplication circuit and the PMOS transistors P3~P4 and the operational amplifier OP2 another.

Because the PMOS transistors P1~P3 are M times the size of the PMOS transistor P0, the duplicated current is M times the inductor current signal IL and is output as the current detection signal ID. In this embodiment, M<<1. Further, because the current detection signal ID is duplicated from the inductor current signal IL, the current detection signal ID has a rising slope proportional to that of the inductor current signal IL. In this case, the current detection signal ID through the PMOS transistor P3 is output to the slope compensation unit 30A, and the current detection signal ID trough the PMOS transistor P1 is output to the PWM comparator 12.

FIG. 12 shows an embodiment of a slope compensation unit. As shown, the slope compensation unit 30A comprises a slope extraction unit 31A extracting the rising slope of the induction signal IL according to the current detection signal ID from the current detection unit 20 and a synthesis unit 32A detecting the duty cycle of the PWM driving signal, delivering the falling slope of the inductor current signal IL according to the rising slope of the inductor current signal IL and the duty cycle of the PWM driving signal SPWMD, and generating the slope compensation signal SSC accordingly.

The slope extraction unit 31A comprises a resistor R3 converting the current detection signal ID to a corresponding voltage VD and a differentiation circuit differentiating the corresponding voltage VD. Because the current detection signal ID from the current detection unit 20 and the inductor current signal IL have the same rising slope, the corresponding voltage VD generated according to the current detection signal ID also has the same rising slope. Thus, the corresponding voltage VD can be represented as VD=ID×R3=M× IL×R3, wherein M is the size ratio between the transistors P0 and P1.

The differentiation circuit 301 comprises an operational amplifier OP3, an NMOS transistor N1, a capacitor C1 and a reset switching element SR1, differentiating the corresponding voltage VD to generate a corresponding current signal I1. The current signal I1 can be represented as $$I1 = C1\frac{dV1}{dt} = C1\frac{M \times R3 \times dID}{dt} = C1 \times M \times R3 \times m1,$$

wherein m1 is the rising slope of the inductor current signal IL. Namely, the current signal I1 has the rising slope of the inductor current signal IL.

The synthesis unit 32A comprises a duty cycle detection unit 302, a current mirrors 303 and 304, an integration unit 305, and a voltage-to-current converter 306. The duty cycle detection unit 302 detects the duty cycle of the PWM driving signal SPWMD according to the relationship between input voltage Vin and output voltage Vout of the switching regulator 100 and outputs a set of corresponding control signals S1~SN accordingly. Namely, the control signals S1~SN output from the duty cycle detection unit 302 include the information about the duty cycle of the PWM driving signal SPWMD.

The current mirror 303 amplifies the current signal I1 with the rising slope m1 of the inductor current signal IL according to the control signal S1~SN and generates a current signal I2 which is K times the current signal I1.

The integration unit 305 comprises a capacitor C2 and a reset switching element SR2, integrating the current signal I2 to generate a corresponding voltage V2. Namely, the voltage V2 can be represented as $$V2 = \frac{1}{C2}\int K \times I1 \times dt = K \times \frac{C1}{C2} \times M \times R3 \times m1 \times t.$$

The voltage-to-current converter 306 comprises an operational amplifier OP4, an NMOS transistor N2 and a resistor R4, converting the voltage V2 to a corresponding current signal I3. The current signal I3 can be regarded as $$I3 = \frac{V3}{R4} = \frac{V2}{R4} = K \times \frac{C1}{C2} \times \frac{R3}{R4} \times M \times m1 \times t.$$

In the embodiment, the capacitors C1 and C2 can be identical, and the resistors R3 and R3 can be also identical, and K can be $$\frac{1}{2} \times \frac{D}{1-D}.$$

Thus, the current signal I3 can be rewritten as $$I3 = M \times \frac{1}{2} \times \frac{D}{1-D} \times m1 \times t = M \times \frac{1}{2} \times M2 \times t.$$

In another embodiment, K can also be $$\frac{D}{1-D}$$

or the like. Namely, K is a function of duty cycle of the PWM driving signal SPWMD.

The current mirror 304 comprises two PMOS transistor P7 and P8, duplicating the current signal I3 to generate a corresponding current signal I4 to serve as the slope compensation signal SSC. Because the current signal I3 has a compensation slope proportional to the falling slope m2 of inductor current signal IL, the slope compensation signal SSC has the same compensation slope.

FIG. 13 shows an embodiment of the duty cycle detection unit. As shown, the duty cycle detection unit 302 comprises a resistor-string formed N+1 resistors RS and N comparators CMP1~CMPN. For example, the comparator CMP1 outputs the control signal S1 when the output voltage Vout exceeds the divided voltage VRS1, the comparators CMP1 and CMP2 output the control signals S1 and S2 when the output voltage Vout exceeds the divided voltage VRS2, the comparators CMP1~CMP3 output the control signals S1~S3 when the output voltage Vout exceeds the divided voltage VRS3, and so on. Namely, the duty cycle detection unit 302 generates corresponding control signals S1~SN to the current mirror 303 according to the ratio between the input voltage Vin and the output voltage Vout of the switching regulator 100 in the steady state. Thus, the control signals include the information about the duty cycle of the PWM driving signal SPWMD in the steady state.

FIG. 14 shows an embodiment of the current mirror 303. The current mirror 303 comprises N+1 PMOS transistors PA0~PAN and N switching elements SW1~SWN. In this embodiment, the amplification ratio K of the current mirror 303 is a function of duty cycle D. For example, when the duty cycle is 0.5, $$\frac{D}{1-D}$$

is 1 and the switching element SW1 is turned on according to the control signal S1 such that the current signal I2 equals the current signals I1. When the duty cycle is 0.6, $$\frac{D}{1-D}$$

is 1.5 and the switching elements SW1 and SW2 are turned on according to the control signals S1~S2 such that the current signal I2 is 1.5 times the current signal I1.

When the duty cycle is 0.7, $$\frac{D}{1-D}$$

is 2.3 and the switching elements SW1~SW3 are turned on according to the control signals S1~S3 such that the current signal I2 is 2.3 times the current signal I1. When the duty cycle is 0.8, $$\frac{D}{1-D}$$

is 4 and the switching elements SW1~SW4 are turned on according to the control signals S1~S4 such that the current signal I2 is 4 times the current signal I1. When the duty cycle is 0.9, $$\frac{D}{1-D}$$

is 9 and the switching elements SW1~SW5 are turned on according to the control signals S1~S5 such that the current signal I2 is 9 times the current signal I1. Namely, the current mirror 303 amplifies the current signal I1 by $$\frac{D}{1-D}$$

times according to the control signals S1~SN from the duty cycle detection unit 302 for output as the current signal I2.

FIG. 15 shows another embodiment of a slope compensation unit. As shown, the slope compensation unit 30B comprises a slope extraction unit 31B extracting the rising slope m1 of the induction current signal IL according to the current detection signal ID from the current detection unit 20 and a synthesis unit 32B generating the slope compensation signal SSC according to the current detection signal ID with rising slope m1 of the inductor current signal IL.

In this embodiment, the slope extraction unit 31B can be a subtraction circuit to sample the current detection signal ID during an initial period to serve as an initial current signal IDI and generate a current signal IX with the rising slope m1 of the inductor current signal IL by subtracting the initial current signal IDI from the current detection signal ID after the initial period. The slope extraction unit 31B (subtraction circuit) comprises PMOS transistors P9~P10, NMOS transistors N3 and N4, resistors R5~R7, an operational amplifier OP5, a capacitor C3, and switching elements SWA and SWB, in which the PMOS transistors P9 and P10 form a current mirror and the resistors R5~R7 are identical.

FIG. 16 shows the relationship between the current detection signal ID, the initial current signal IDI and the current signal IX. As shown in FIGS. 15 and 16, in the initial period PI, the switching elements SWA and SWB are turned on, the source terminals of the transistors N3 and N4 are coupled and the output terminal of the operational amplifier OP5 is coupled to the gate terminals of the NMOS transistors N3 and N4 both. Hence, a current ID flows through the NMOS transistor N3, and another current ID also flows through the NMOS transistor N4. At this time, the current signal IX is zero. Further, the capacitor C3 stores the voltage output from the operational amplifier OP5, such that the current detection signal ID through the NMOS transistor N4 can be sampled.

At time t1, the switching elements SWA and SWB are turned off, and the NMOS transistor N3 is still controlled by the operational amplifier OP5 but the NMOS transistor N4 is controlled by the stored voltage V4 in the capacitor C3. Hence, after the initial period PI, the current detection signal ID through the NMOS transistor N3 is still increased following the inductor current signal IL, but the current detection signal ID through the NMOS transistor N4 at time t1 is sampled and maintained by the capacitor C3 to serve as the initial current signal IDI. Because the current detection signal ID through the NMOS transistor N3 rises following the inductor current signal IL and the initial current signal IDI through the NMOS transistor N4 is maintained at a constant level, the current signal IX can be regarded as IX=ID−IDI.

For example, the current detection signal ID can be assumed as ID=Io+m1×t, wherein Io is a constant term and m1 is the rising slope of the induct current signal IL. When the slope extraction unit 31B samples an initial value of the current detection signal ID and extracts the initial value from the present value of the current detection signal ID, the constant term Io is removed and the remaining portion with the rising slope m1 is obtained. Namely, the current signal IX can be represented as m1×t.

In this embodiment, the synthesis unit 32B comprises the duty cycle detection unit 302 and the current mirror 303 only. The duty cycle detection unit 302 detects the duty cycle of the PWM driving signal SPWMD according to the relationship between input voltage Vin and output voltage Vout of the switching regulator 100 and outputs a set of corresponding control signals S1~SN accordingly. Operation and structure of the duty cycle detection 302 and the current mirror 303 are similar to that shown in FIG. 12 and thus are omitted for simplification. The current mirror 303 amplifies the current signal IX with the rising slope m1 of the inductor signal IL according to the control signals S1~SN and generates a current signal K times the current signal IX to serve as the slope compensation signal SSC, wherein K can be $$\frac{D}{1-D}.$$

Namely, slope compensation signal SSC can be represented as:

$$SSC = KIX = \frac{D}{1-D} \times m1 \times t = m2 \times t$$

Hence, the slope compensation signal SSC has a compensation slope identical to the falling slope m2 or ½ m2 of the inductor current signal IL. Because the slope compensation unit 30 can generate a slope compensation signal SSC with a compensation slope identical to the falling slope m2 or ½ m2 of the inductor current IL to perform a slope compensation, perturbation will be rejected out in a few cycle and noise immunity enhanced as shown in FIGS. 7 and 8.

Also provided is a slope compensation method for a switching regulator. FIG. 17 is a flowchart of a slope compensation method of the invention.

In step S701, the inductor current signal IL is detected to generate a current detection signal ID proportional to the inductor current signal IL. For example, the inductor current signal IL can be duplicated and output a duplicated current M times the inductor current signal IL, to serve as the current detection signal ID. In this embodiment, M<<1.

In step S703, a rising slope of the inductor current signal IL is detected. For example, as shown in FIG. 12, the rising slope of inductor current signal IL can also be detected by converting the current detection signal ID to the first voltage V1 and differentiating the first voltage V1 to generate a first current signal I1 with the rising slope m1 of the inductor current signal IL. The first current signal I1 can be represented as $$I1 = C1\frac{dV1}{dt} = C1\frac{M \times R3 \times dID}{dt} = C1 \times m \times R3 \times m1,$$

wherein m1 is the rising slope of the inductor current signal IL. Namely, the current signal I1 has the rising slope m1 of the inductor signal IL.

Alternatively, the rising slope m1 of inductor current signal IL can be detected by sampling the current detection signal ID in an initial period to serve as an initial current signal IDI and subtracting the initial current signal IDI from the current detection signal ID after the initial period to generate a current signal IX with the rising slope m1 of the inductor current signal IL. For example, as shown in FIG. 16, the current detection signal ID can be ID=Io+m1×t, wherein Io is a constant term and m1 is the rising slope of the induct current signal IL. When the slope extraction unit 31B in FIG. 15 samples an initial value of the current detection signal ID and extracts the initial value from the present value of the current detection signal ID, the constant term Io is removed and the remaining portion with the rising slope m1 is obtained. Namely, the current signal IX can be represented as m1×t.

In step S705, a duty cycle of a PWM driving signal generated by the PWM unit is detected. For example, the duty cycle (D) of the PWM driving signal SPWMD is detected according to a proportion between the input voltage Vin and output voltage Vout of the switching regulator 100. As shown in FIG. 13, the duty cycle detection unit 302 detects the duty cycle of the PWM driving signal SPWMD according to input and output voltages Vin and Vout of the switching regulator 100 and generates a set of corresponding control signals S1~SN accordingly. For example, the comparator CMP1 outputs the control signal S1 when the output voltage Vout exceeds the divided voltage VRS1, the comparators CMP1 and CMP2 output the control signals S1 and S2 when the output voltage Vout exceeds the divided voltage VRS2, the comparators CMP1~CMP3 output the control signals S1~S3 when the output voltage Vout exceeds the divided voltage VRS3, and so on. Namely, the duty cycle detection unit 302 generates corresponding control signals S1~SN to the current mirror 303 according to the ratio between the input voltage Vin and the output voltage Vout (the duty cycle) of the switching regulator 100 in the steady state.

In step S707, a slope compensation signal SSC with a compensation slope proportional to a falling slope m2 of the inductor current signal IL is generated according to the rising slope m1 of the inductor current signal IL and the duty cycle of the PWM driving signal SPWMD.

As shown in FIG. 12, the current mirror 303 amplifies the current signal I1 with the rising slope m1 of the inductor signal IL according to the control signals S1~SN and generates a current signal I2 K times the current signal I1. The integration unit 305 integrates the current signal I2 to generate a corresponding voltage V2. Namely, the voltage V2 can be represented as $$V2 = \frac{1}{C2}\int K \times I1 \times dt = K \times \frac{C1}{C2} \times M \times R3 \times m1 \times t.$$

The voltage-to-current converter 306 converts the voltage V2 to a corresponding current signal I3. The current signal I3 can be regarded as $$I3 = \frac{V3}{R4} = \frac{V2}{R4} = K \times \frac{C1}{C2} \times \frac{R3}{R4} \times M \times m1 \times t.$$

In the embodiment, the capacitors C1 and C2 can be identical, as can resistors R3 and R4, and K can be $$\frac{1}{2} \times \frac{1}{1-D}.$$

Thus, the current signal I3 can be rewritten as $$I3 = M \times \frac{1}{2} \times \frac{D}{1-D} \times m1 \times t = M \times \frac{1}{2} \times m2 \times t.$$

In another embodiment, K can be $$\frac{D}{1-D}$$

or the like. Namely, K is a function of duty cycle of the PWM driving signal SPWMD. The current mirror 304 duplicates the current signal I3 to generate a corresponding current I4 to serve as the slope compensation signal SSC. Because the current signal I3 has a compensation slope proportional to the falling slope m2 of inductor current signal IL, the slope compensation signal SSC has the same compensation slope too.

Alternatively, as shown in FIG. 15, the current mirror 303 amplifies the current signal IX with the rising slope m1 of the inductor current signal IL according to the control signals S1~SN and generates a current signal K times the current signal IX to serve as the slope compensation signal SSC, wherein K can be $$\frac{D}{1-D}.$$

Namely, slope compensation signal SSC can be represented as $$SSC = KIX = \frac{D}{1-D} \times m1 \times t = m2 \times t.$$

Hence, the slope compensation signal SSC has a compensation slope identical to the falling slope m2 of the inductor current signal IL. In another embodiment, K can be designed to be $$\frac{1}{2}\frac{D}{1-D},$$

and the compensation slope of the slope compensation signal SSC would be $$\frac{1}{2}m2 \times t.$$

In step S709, a feedback signal Ve" is generated by the output voltage Vout of the switching regulator 100. As shown in FIG. 10, the resistors R1 and R2 in the feedback unit 40 generate a divided voltage V12 according to the output voltage Vout of the switching regulator 100 for output to the error amplifier 41. The error amplifier 41 generates the output signal Ve according to the difference between the divided voltage V12 and a reference voltage Vref. The additional phase compensation unit 42 performs a phase compensation for the output signal Ve and generates a feedback signal Ve" to the PWM comparator 12.

In step S711, the PWM unit 10 is controlled according to the slope compensation signal SSC, the current detection signal ID and the feedback signal Ve". For example, as shown in FIG. 10, the feedback signal Ve" can be a voltage signal, and the current detection signal ID and the slope compensation signal SSC are current signals. Further, the current detection signal ID and the slope compensation signal SSC are combined and converted to a voltage signal by a resistor (not shown) for comparison with the feedback signal Ve". Alternatively, a voltage-current converter between the error amplifier 41 and the phase compensation unit 42 converts the output signal Ve to a current signal for comparison with the combined current detection signal ID and slope compensation signal SSC.

The PWM comparator 12 in the PWM unit 10 receives the slope compensation signal SSC, the current detection signal ID and the feedback signal Ve" to generate the PWM driving signal SPWMD. In some embodiments, the duty cycle of the pulse width modulation driving signal SPWMD is determined by the control signal CS. For example, when the clock signal received at the set terminal (S) of the SR latch 14 goes high, the PWM driving signal SPWMD of the SR latch 14 goes high, such that the PMOS transistor P0 and the NMOS transistor N0 are turned on and off respectively and the inductor current signal IL increases accordingly. If the voltage signal generated by the combination of the current detection signal ID and the slope compensation signal SSC exceeds the feedback signal Ve, the comparator 12 generates a low logic output to reset the SR latch 14. Hence, the PWM driving signal SPWMD of the SR latch 14 goes low, such that the PMOS transistor P0 and the NMOS transistor N0 are turned off and on respectively, and the inductor current signal IL decreases until the PWM driving signal SPWMD of the SR latch 14 goes high again.

Because the slope compensation signal SSC can have a compensation slope proportional to the falling slope m2 of the inductor current signal IL to perform a slope compensation according to the duty cycle D of the PWM driving signal SPWMD and the rising slope m1 of the inductor current IL, perturbation will be rejected in a few cycles and noise immunity enhanced as shown in FIGS. 7 and 8.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A switching regulator, comprising:
   an inductor coupled to a load;
   a pulse width modulation (PWM) unit comprising an output stage, the PWM unit generating a PWM driving signal to control the output stage, such that the inductor delivers an inductor current signal to the load; and
   a slope compensation unit outputting a slope compensation signal with a compensation slope proportional to a falling slope of the inductor current signal to the PWM unit according to the inductor current signal, wherein the slope compensation unit detects a rising slope of the inductor current signal and obtains the falling slope of the inductor current signal according to the duty cycle of the PWM driving signal and the detected rising slope of inductor current signal.

2. The switching regulator as claimed in claim 1, further comprising a current detection unit detecting the inductor current signal and outputting a current detection signal proportional to the inductor current signal to the PWM unit and the slope compensation unit.

3. The switching regulator as claimed in claim 1, further comprising a current detection unit detecting the inductor current signal and outputting a current detection signal proportional to the inductor current signal to the PWM unit and the slope compensation unit.

4. The switching regulator as claimed in claim 2, wherein the slope compensation unit comprises:
   a slope extraction unit extracting the rising slope of the inductor current signal according to the current detection signal; and
   a synthesis unit detecting the duty cycle of the PWM driving signal, the synthesis unit delivering the falling slope of the inductor current signal according to the rising slope of the inductor current signal and the duty cycle of the PWM driving signal, the synthesis unit generating the slope compensation signal accordingly.

5. The switching regulator as claimed in claim 4, the slope extraction unit comprising a subtraction circuit sampling the current detection signal during an initial period to serve as an initial current signal and generating a first current signal with the rising slope of the inductor current signal by subtracting the initial current signal from the current detection signal after the initial period.

6. The switching regulator as claimed in claim 5, wherein the synthesis unit comprises:
   a duty cycle detection unit detecting the duty cycle of the PWM driving signal according to input and output voltages of the switching regulator and generating a set of corresponding control signals accordingly; and
   a current mirror circuit generating the slope compensation signal with the compensation slope according to the corresponding control signals and the first current signal.

7. The switching regulator as claimed in claim 4, wherein the slope extraction unit comprises:
   a resistor converting the current detection signal to a corresponding voltage; and
   a differentiation circuit differentiating the corresponding voltage to obtain a first current signal with the rising slope of the current detection signal.

8. The switching regulator as claimed in claim 7, wherein the synthesis unit comprises:
   a duty cycle detection unit detecting the duty cycle of the PWM driving signal according to input and output voltages of the switching regulator and generating a set of corresponding control signals accordingly;
   a first current mirror circuit generating a second current signal with the compensation slope according to the corresponding control signals and the first current signal;
   an integration unit integrating the second current signal to generate a first voltage;
   a voltage-to-current conversion unit converting the first voltage to a third current signal; and
   a second current mirror circuit duplicating the third current signal to serve as the slope compensation signal.

9. A slope compensation method for a switching regulator, the method comprising:
   detecting a rising slope of an inductor current signal flowing to a load from a PWM unit;
   detecting a duty cycle of a PWM driving signal generated by the PWM unit;
   generating a slope compensation signal with a compensation slope proportional to a falling slope of the inductor current signal according to the rising slope of the inductor current signal and the duty cycle of the PWM driving signal; and
   controlling the PWM unit according to the slope compensation signal.

10. The slope compensation method as claimed in claim 9, wherein the duty cycle of the PWM driving signal is detected according to a proportion between input and output voltages of the switching regulator.

11. The slope compensation method as claimed in claim 9, further comprising:
   detecting the inductor current signal to generate a current detection signal proportional to the inductor current signal; and
   generating a feedback signal by an output voltage of the switching regulator;
   such that the PWM unit is controlled by the current detection signal, the slope compensation signal, and the feedback signal.

12. The slope compensation method as claimed in claim 9, wherein detection of the rising slope of the inductor current signal comprises:
   sampling the current detection signal in an initial period to serve as an initial current signal; and
   subtracting the initial current signal from the current detection signal after the initial period to generate a first current signal with the rising slope of the inductor current signal.

13. The switching regulator as claimed in claim 12, wherein generation of the slope compensation signal comprises amplifying the first current signal according to the duty cycle of the PWM driving signal to generate the slope compensation signal.

14. The slope compensation method as claimed in claim 9, wherein detection of the rising slope of the inductor current signal comprises:
   converting the current detection signal to a first voltage; and
   differentiating the first voltage to generate a first current signal with the rising slope of the inductor current signal.

15. The switching regulator as claimed in claim 14, wherein generation of the slope compensation signal comprises:
   amplifying the first current signal according to the duty cycle of the PWM driving signal to generate a second current signal with the compensation slope proportional to the falling slope of the inductor current signal;
   integrating the second current signal to generate a second voltage; and
   converting the second voltage to the slope compensation signal.

16. A switching regulator, comprising:
   an inductor coupled to a load;
   a slope compensation unit coupled to the inductor, the slope compensation unit obtaining a falling slope of an inductor current signal flowing through the inductor according to a rising slope of the inductor current signal and a duty cycle of a pulse width modulation (PWM) driving signal, the slope compensation unit outputting a slope compensation signal with a compensation slope proportional to the falling slope of the inductor current signal;
   a current detection unit detecting the inductor current signal and outputting a current detection signal proportional to the inductor current signal to the slope compensation unit;
   a pulse width modulation unit comprising a comparator receiving the current detection signal, the slope compensation signal, and a feedback signal, and the pulse width modulation unit further comprising at least one output transistor outputting the inductor current signal to the inductor; and
   a feedback unit coupled between the comparator and the inductor, the feedback unit generating the feedback signal according to an output voltage of the switching regulator.

17. The switching regulator as claimed in claim 16, the slope compensation unit comprising a subtraction circuit, the subtraction circuit sampling the current detection signal during an initial period to serve as an initial current signal and generating a first current signal with the rising slope of the inductor current signal by subtracting the initial current signal from the current detection signal after the initial period.

18. The switching regulator as claimed in claim 17, wherein the slope compensation unit further comprises:
   a duty cycle detection unit coupled to input and output voltages of the switching regulator, the duty cycle detection unit detecting the duty cycle of the PWM driving signal according to the input and output voltages of the switching regulator, the duty cycle detection unit generating a corresponding control signal accordingly; and
   a first current mirror circuit coupled to the duty cycle detection unit, the first current mirror circuit generating the slope compensation signal with the compensation slope according to the corresponding control signal and the first current signal.

19. The switching regulator as claimed in claim 16, wherein the slope compensation unit comprises:
   a resistor converting the current detection signal to a corresponding voltage; and
   a differentiation circuit differentiating the corresponding voltage to obtain a first current signal with the rising slope of the inductor current signal.

20. The switching regulator as claimed in claim 19, wherein the slope compensation unit further comprises:
   a duty cycle detection unit coupled to input and output voltages of the switching regulator, the duty cycle detection unit detecting the duty cycle of the PWM driving signal according to the input and output voltages, the duty cycle detection unit generating a corresponding control signal accordingly;
   a first current mirror circuit coupled to the duty cycle detection unit, the first current mirror generating a second current signal with the compensation slope according to the corresponding control signal and the first current signal with the rising slope of the inductor current signal;
   an integration unit coupled to the first current mirror circuit, the integration unit integrating the second current signal to generate a first voltage;
   a voltage-to-current conversion unit coupled to the integration unit, the voltage-to-current conversion unit converting the first voltage to a third current signal; and
   a second current mirror circuit duplicating the third current signal to serve as the slope compensation signal.

* * * * *